United States Patent
Agrawal et al.

(10) Patent No.: US 12,361,403 B2
(45) Date of Patent: Jul. 15, 2025

(54) FACILITATING USER SELECTION OF ONE OF MULTIPLE BARCODES IN A CAMERA SYSTEM FIELD OF VIEW

(71) Applicant: Motorola Mobility LLC, Chicago, IL (US)

(72) Inventors: Amit Kumar Agrawal, Bangalore (IN); Rahul Bharat Desai, Hoffman Estates, IL (US); Hariprasad Shanbhogue Alampady, Bangalore (IN)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 18/127,384

(22) Filed: Mar. 28, 2023

(65) Prior Publication Data
US 2024/0330894 A1    Oct. 3, 2024

(51) Int. Cl.
  *G06Q 30/00* (2023.01)
  *G06Q 20/10* (2012.01)
  *G06Q 20/32* (2012.01)
  *G06Q 20/36* (2012.01)
  *G06Q 30/0207* (2023.01)

(52) U.S. Cl.
  CPC ......... *G06Q 20/3274* (2013.01); *G06Q 20/10* (2013.01); *G06Q 20/36* (2013.01); *G06Q 30/0213* (2013.01)

(58) Field of Classification Search
  None
  See application file for complete search history.

(56) References Cited

U.S. PATENT DOCUMENTS

| 12,248,845 B2 | 3/2025 | Agrawal et al. | |
| 2008/0288403 A1* | 11/2008 | von Mueller | G06Q 20/40 |
| | | | 705/44 |
| 2013/0262309 A1* | 10/2013 | Gadotti | G06Q 20/3274 |
| | | | 705/44 |

(Continued)

OTHER PUBLICATIONS

Understanding 20-BarCode Technology and Applications in M-Commerce—Design and Implementation of a 2D Barcode Processing Solution / IEEE Xplore/ IEEE Conference Jul. 1, 2007 / 31st Annual International Computer Software and Applications Conference (COMPSAC 2007). (Year: 2007)*

(Continued)

*Primary Examiner* — Matthew T Sittner
(74) *Attorney, Agent, or Firm* — FIG. 1 Patents

(57) ABSTRACT

A computing device includes at least one camera system. When the camera application is running, the scene from the at least one camera system is analyzed to identify one or more barcodes in the scene. In some situations, multiple barcodes encoding payment links are identified in the scene. In such situations, for each of the multiple barcodes encoding payment links, the barcode is displayed along with the payment link encoded in the barcode and a description of the payment link (e.g., a name of the digital wallet corresponding to the payment link). Various additional information to help the user select one of the payment links may also be displayed, such as a current balance in the digital wallet corresponding to the payment link, rewards for using the digital wallet, discounts for using the digital wallet, and so forth.

20 Claims, 10 Drawing Sheets

(56) References Cited

U.S. PATENT DOCUMENTS

| | | | |
|---|---|---|---|
| 2013/0262315 A1* | 10/2013 | Hruska | G06Q 20/3276 |
| | | | 705/67 |
| 2014/0335958 A1* | 11/2014 | Weisman | A63F 13/00 |
| | | | 463/37 |
| 2015/0206120 A1* | 7/2015 | Murphy | G06Q 30/0213 |
| | | | 705/19 |
| 2015/0254698 A1* | 9/2015 | Bondesen | G06Q 20/36 |
| | | | 705/14.17 |
| 2015/0319138 A1* | 11/2015 | Yan | H04L 63/145 |
| | | | 726/11 |
| 2017/0249685 A1* | 8/2017 | Villa | G06F 16/9554 |
| 2018/0040150 A1 | 2/2018 | Saporetti | |
| 2018/0167283 A1 | 6/2018 | Moritomo | |
| 2018/0225656 A1* | 8/2018 | Ray | G06Q 20/3227 |
| 2018/0308117 A1* | 10/2018 | Gupta | G06Q 30/0226 |
| 2019/0043042 A1* | 2/2019 | Kadam | G06Q 20/202 |
| 2021/0042732 A1* | 2/2021 | Agarwalla | G06Q 20/3278 |
| 2021/0312217 A1* | 10/2021 | Nater | G06K 7/1408 |
| 2021/0312576 A1* | 10/2021 | Clarke | G06Q 20/202 |
| 2023/0028859 A1* | 1/2023 | deWaide | G06K 7/10722 |
| 2023/0154148 A1 | 5/2023 | Hada | |
| 2023/0224389 A1 | 7/2023 | Hill et al. | |
| 2023/0244891 A1* | 8/2023 | Ma | G06K 7/10722 |
| | | | 235/462.09 |
| 2023/0281887 A1 | 9/2023 | Wesner et al. | |
| 2024/0169060 A1* | 5/2024 | Proff | G06F 21/554 |
| 2024/0330628 A1 | 10/2024 | Agrawal et al. | |
| 2024/0331426 A1 | 10/2024 | Agrawal et al. | |

OTHER PUBLICATIONS 2D barcodes for mobile phones, IEEE Xplore/ IEEE Conferences Jan. 1, 2005 /2005 2nd Asia Pacific Conference on Mobile Technology, Applications and Systems (p. 8 pp. -8). (Year: 2005)*

"Download Microsoft Authenticator", Microsoft Security [retrieved Mar. 15, 2023]. Retrieved from the Internet <https://www.microsoft.com/en-us/security/mobile-authenticator-app?cmp=vgfp7d_40oczo#primaryR3>., 4 Pages.

Agrawal, Amit Kumar, et al., "US Application as Filed", U.S. Appl. No. 18/127,350, filed Mar. 28, 2023, 38 pages.

Agrawal, Amit Kumar, et al., "US Application as Filed", U.S. Appl. No. 18/127,363, filed Mar. 28, 2023, 47 pages.

Rajput, Aditya, "7 best QR Code scanner apps for Android and iOS leading the pack in 2023", Beaconstac Blog [retrieved Mar. 15, 2023]. Retrieved from the Internet <https://blog.beaconstac.com/2019/09/best-qr-code-scanner-apps/>., Jan. 17, 2023, 22 Pages.

U.S. Appl. No. 18/127,350, "Non-Final Office Action", U.S. Appl. No. 18/127,350, Dec. 7, 2023, 6 pages.

U.S. Appl. No. 18/127,350, "Final Office Action", U.S. Appl. No. 18/127,350, Apr. 24, 2024, 6 pages.

U.S. Appl. No. 18/127,350, "Non-Final Office Action", U.S. Appl. No. 18/127,350, Sep. 10, 2024, 8 pages.

"Notice of Allowance", U.S. Appl. No. 18/127,350, Jan. 23, 2025, 9 pages.

* cited by examiner

FACILITATING USER SELECTION OF ONE OF MULTIPLE BARCODES IN A CAMERA SYSTEM FIELD OF VIEW

BACKGROUND

As technology has advanced our uses for computing devices have expanded. One such use is to gather information for the user from a quick response (QR) code. Typically, the user opens a camera application on his or her computing device and moves the computing device around as needed so that the QR code is captured by the computing device. The information in the QR code is then displayed to the user, such as displaying a uniform resource locator (URL) encoded in the QR code.

BRIEF DESCRIPTION OF THE DRAWINGS

Embodiments of facilitating user selection of one of multiple barcodes in a camera system field of view are described with reference to the following drawings. The same numbers are used throughout the drawings to reference like features and components.

DETAILED DESCRIPTION

Facilitating user selection of one of multiple barcodes in a camera system field of view is discussed herein. Generally, in one or more implementations a computing device includes at least one camera system. When a camera application is running, the scene from the at least one camera system is analyzed to identify one or more barcodes in the scene. In some situations, multiple barcodes are identified in the scene. In such situations, one or more of the multiple barcodes are selected based on a current context of the computing device. The current context can be, for example, an operating system running on the computing device (e.g., a brand of the operating system), a configuration of the computing device (e.g., which payment applications are installed on the computing device), an operation context of the computing device (e.g., a payment application that activated the camera system), and so forth. One or more actions are taken based on the selected one or more barcodes, such as displaying a preview image with the selected one or more barcodes and one or more URLs encoded in the selected one or more barcodes.

Accordingly, the techniques discussed herein automatically select one or more of multiple barcodes in a scene, and take an appropriate action based on the selected one or more barcodes. This filters out barcodes that are not appropriate for the computing device based on the current context of the computing device. This allows the user to quickly take an action based on the multiple barcodes in the scene that are appropriate (based on the current context of the computing device) for the computing device.

Additionally or alternatively, when the camera application is running, the scene from the at least one camera system is analyzed to identify one or more barcodes in the scene. In some situations, multiple barcodes encoding payment links are identified in the scene. In such situations, for each of the multiple barcodes encoding payment links, the barcode is displayed along with the payment link encoded in the barcode and a description of the payment link (e.g., a name of the digital wallet corresponding to the payment link). Various additional information to help the user select one of the payment links may also be displayed, such as a current balance in the digital wallet corresponding to the payment link, rewards for using the digital wallet, discounts for using the digital wallet, and so forth.

Accordingly, the techniques discussed herein automatically identify multiple barcodes that encode payment links corresponding to digital wallets and display various information identifying and describing the digital wallets. This allows the user to make a more informed decision on which payment link to select without having to switch to different screens or applications on the computing device to make the decision.

Figure 1:
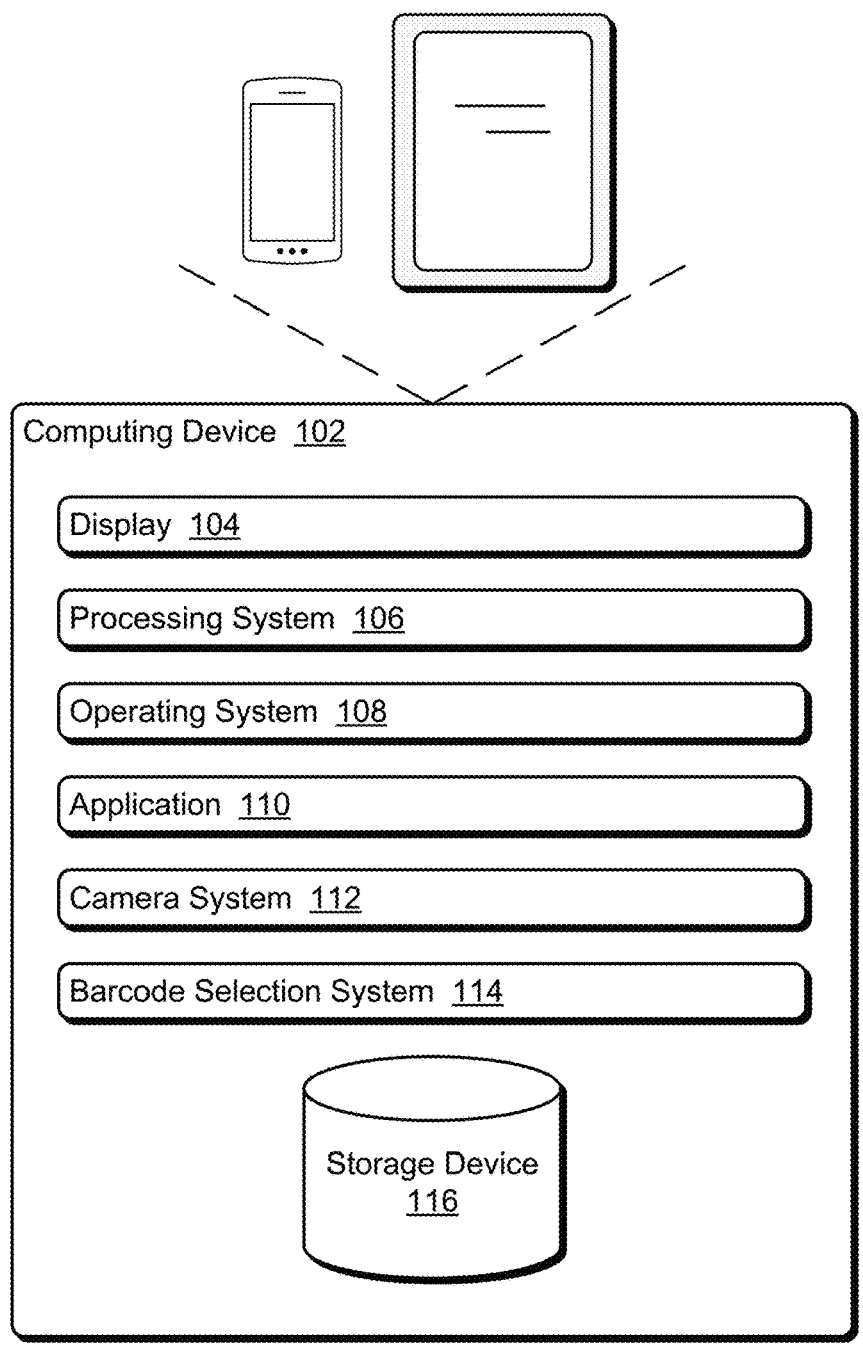
FIG. 1 illustrates an example computing device implementing the techniques discussed herein.

FIG. 1 illustrates an example computing device 102 implementing the techniques discussed herein. The computing device 102 can be, or include, many different types of computing or electronic devices. For example, the computing device 102 can be a smartphone or other wireless phone, a camera (e.g., compact or single-lens reflex), or a tablet or phablet computer. By way of further example, the computing device 102 can be a notebook computer (e.g., netbook or ultrabook), a laptop computer, a wearable device (e.g., a smartwatch, an augmented reality headset or device, a virtual reality headset or device), a personal media player, a personal navigating device (e.g., global positioning system), an entertainment device (e.g., a gaming console, a portable gaming device, a streaming media player, a digital video recorder, a music or other audio playback device), a video camera, an Internet of Things (IoT) device, a fitness tracker, a smart TV, an automotive computer, and so forth.

The computing device 102 includes a display 104, which can be configured as any suitable type of display, such as an organic light-emitting diode (OLED) display, active matrix OLED display, liquid crystal display (LCD), in-plane shifting LCD, projector, and so forth. Although illustrated as part of the computing device 102, it should be noted that the display 104 can be implemented separately from the computing device 102. In such situations, the computing device 102 can communicate with the display 104 via any of a variety of wired (e.g., Universal Serial Bus (USB), IEEE 1394, High-Definition Multimedia Interface (HDMI)) or wireless (e.g., Wi-Fi, Bluetooth, infrared (IR)) connections. For example, the display 104 may be separate from the computing device 102 and the computing device 102 (e.g., a streaming media player) communicates with the display 104 via an HDMI cable.

The computing device 102 also includes a processing system 106 that includes one or more processors, each of which can include one or more cores. The processing system 106 is coupled with, and may implement functionalities of, any other components or modules of the computing device 102 that are described herein. In one or more embodiments, the processing system 106 includes a single processor having a single core. Alternatively, the processing system 106 includes a single processor having multiple cores or multiple processors (each having one or more cores).

The computing device 102 also includes an operating system 108. The operating system 108 manages hardware, software, and firmware resources in the computing device 102. The operating system 108 manages one or more applications 110 running on the computing device 102, and operates as an interface between applications 110 and hardware components of the computing device 102.

The computing device 102 also includes a camera systems 112 that captures images digitally using a sensor implemented using any of a variety of different technologies, such as a charge-coupled device (CCD) sensor, a complementary metal-oxide-semiconductor (CMOS) sensor, combinations thereof, and so forth. The camera system 112 includes one or more sensors and one or more lenses.

Although a single camera system is illustrated in FIG. 1, in one or more implementations multiple camera systems 112 are included in the computing device 102. In such implementations, each of the multiple camera systems 112 includes a single sensor and lens. Additionally or alternatively, one or more of the multiple camera systems may include multiple sensors, multiple lenses, or both multiple sensors and multiple lenses. Each of the multiple camera systems may have a lens positioned in any of a variety of locations in the computing device 102, such as positioned to capture images from the front of the computing device 102 (e.g., the same surface as the display is positioned on) or from the back of the computing device 102. In one or more implementations, each of the multiple camera systems 112 includes a sensor (e.g., CCD or CMOS sensor). Additionally or alternatively, one or more of the multiple camera systems may share a sensor.

In one or more implementations, the camera system senses frames of video, also referred to as preview images or preview frames, at a particular rate (e.g., 60 images or frames per second) that can be displayed on the display 104. The preview frames provide the user an indication of the scene that the camera system 112 will capture and store (e.g., in a local storage device or cloud storage) if requested, such as by user input to the computing device 102 to capture an image (e.g., user selection of a button on the computing device 102).

The computing device 102 also includes a barcode selection system 114. The barcode selection system 114 selects, based on a current context of the computing device, one or more of multiple barcodes in one or more preview frames. The current context can be, for example, the operating system 108 running on the computing device 102 (e.g., a brand of the operating system), a configuration of the computing device 102 (e.g., which payment applications 110 are installed on the computing device 102), an operation context of the computing device 102 (e.g., a payment application 110 that activated the camera system 112), and so forth. One or more actions are taken based on the selected one or more barcodes, such as displaying a preview image with the selected one or more barcodes and one or more URLs encoded in the selected one or more barcodes.

A barcode refers to a label that encodes data and is optically readable by a machine. A barcode can take any of a variety of forms, such as a 1-dimensional barcode or a 2-dimensional barcode. A 2-dimensional barcode may also be referred to as a QR code.

A payment application refers to an application that allows a user of the computing device 102 to transmit financial payment (e.g., money) to another device, store funds, and so forth. A payment application may also be referred to as a digital wallet.

Each of the operating system 108, application 110, and barcode selection system 114 can be implemented in a variety of different manners. For example, each of the operating system 108, application 110, and barcode selection system 114 can be implemented as multiple instructions stored on computer-readable storage media and that can be executed by the processing system 106. Additionally or alternatively, each of the operating system 108, application 110, and barcode selection system 114 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth). One or more of the operating system 108, application 110, and barcode selection system 114 can be implemented in the same manner, or the operating system 108, application 110, and barcode selection system 114 can each be implemented in a different manner. Furthermore, although illustrated as separate from the operating system 108, one or both of the application 110 and barcode selection system 114 can be implemented at least in part as part of the operating system 108.

The computing device 102 also includes a storage device 116. The storage device 116 can be implemented using any of a variety of storage technologies, such as magnetic disk, optical disc, Flash or other solid state memory, and so forth. The storage device 116 can store various program instructions and data for any one or more of the operating system 108, application 110, and barcode selection system 114.

Figure 2:
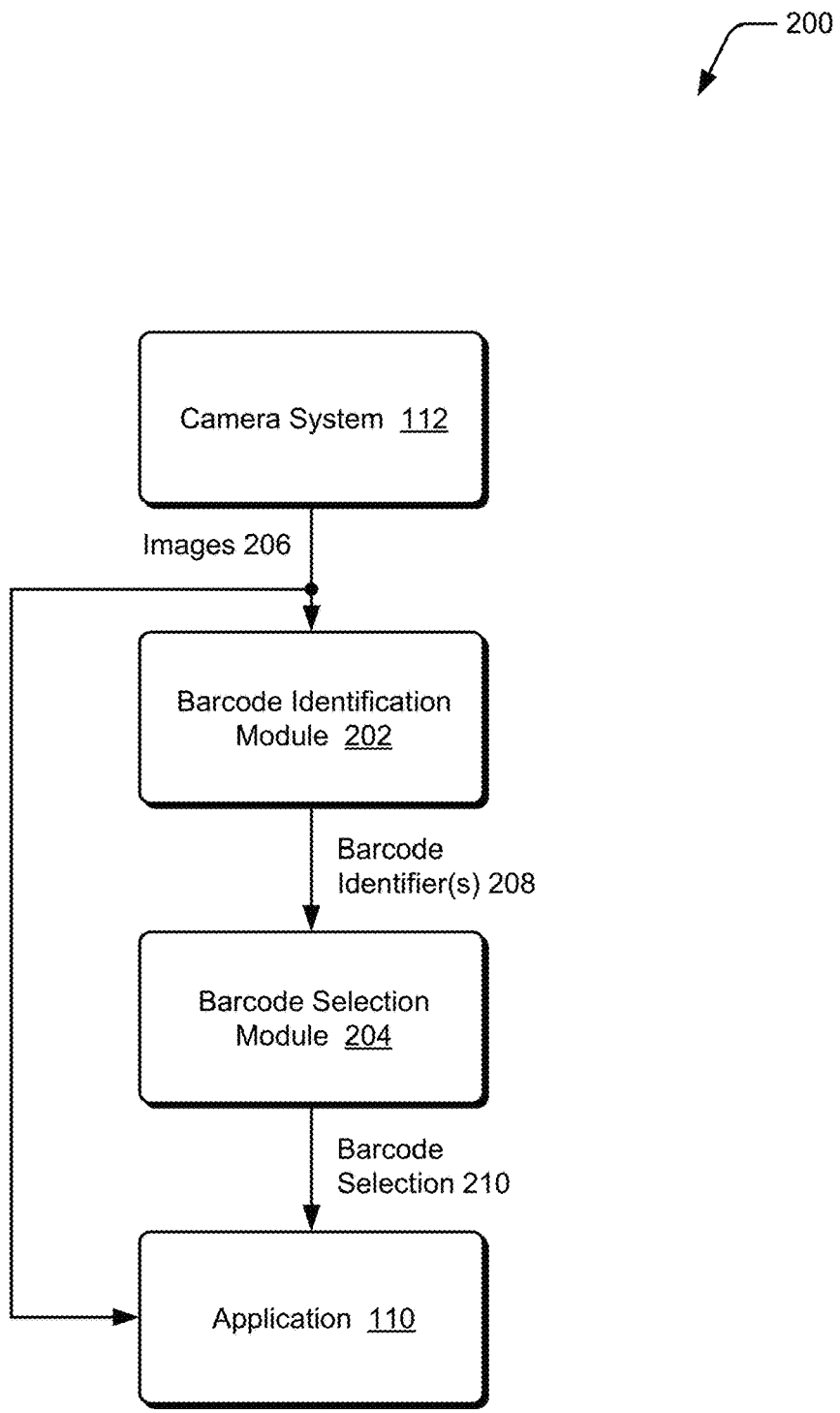
FIG. 2 illustrates an example system implementing the techniques discussed herein.

FIG. 2 illustrates an example system 200 implementing the techniques discussed herein. The system 200 includes a camera system 112, a barcode identification module 202, a barcode selection module 204, and an application 110. In one or more implementations, the barcode identification module 202 and barcode selection module 204 are the barcode selection system 114 of FIG. 1. The camera system 112 can be any of a variety of different types of image capture devices, such as a visible light camera (e.g., capturing images in the 400-700 nanometer (nm) range), an infrared camera (e.g., capturing images in the 1,000-14,000 nm range), and so forth.

The camera system 112 provides images 206 to the barcode identification module 202. These images 206 are, for example, preview images as discussed above.

The barcode identification module 202 scans or analyzes the images 206 to determine whether a barcode is within the field of view of the camera system 112 that captured the images 206 by determining whether any of the images 206 includes a barcode. For a given image, the barcode identification module 202 determines whether the image includes a barcode using any of a variety of public or proprietary techniques. The barcode identification module 202 provides one or more barcode identifiers 208 to the barcode selection module 204. Each barcode identifier 208 is an identifier of a barcode (e.g., a full barcode) in an image 206. The barcode identifier 208 can take any of various forms, such as an identifier of a location of the barcode in the image 206, the barcode itself, and so forth.

If the barcode identification module 202 determines that an image 206 includes multiple barcodes, the barcode selection module 204 receives multiple barcode identifiers 208 and selects one of the barcodes identified by the multiple barcode identifiers 208. In one or more implementations, the barcode selection module 204 selects one or more of the barcodes identified by the multiple barcode identifiers 208 based on a current context of the computing device 102, and applies any of various rules or criteria to select one of the multiple barcodes.

In one or more implementations, the current context of the computing device 102 includes an operating system running on the computing device 102 (e.g., the operating system 108 of FIG. 1). The barcode selection module 204 can apply various rules or criteria based on the operating system, such as selecting the barcode corresponding to a brand of the operating system (e.g., iOS®, ANDROID®, MS-WINDOWS®, and so forth). For example, if there are two versions of an application available for download to the computing device (e.g., one for the ANDROID® operating system and one for the iOS® operating system) and the operating system 108 is an ANDROID® operating system, the barcode selection module 204 selects a barcode that encodes a link to an online store for the ANDROID® operating system rather than a barcode that encodes a link to an online store for the iOS® operating system.

By way of another example, the barcode selection module 204 can select the barcode based on various other aspects of the operating system 108, such as a version of the operating system 108, one or more features supported (or not supported) by the operating system, and so forth.

Additionally or alternatively, the current context of the computing device 102 includes a configuration of the computing device 102 (e.g., the applications 110 of FIG. 1). The barcode selection module 204 can apply various rules or criteria based on the configuration of the computing device 102, such as selecting a barcode corresponding to an application 110 that is installed or enabled on the computing device 102 rather than a barcode corresponding to an application that is not installed or is disabled on the computing device 102. For example, if a payment application ABC (e.g., a digital wallet) is installed on the computing device 102 but a payment application XYZ (e.g., a different digital wallet) is not installed on the computing device 102 (or is installed but disabled or deactivated), the barcode selection module 204 selects a barcode that encodes a link to the payment application ABC rather than a barcode that encodes a link to the payment application XYZ. An application may be enabled or disabled in any of a variety of manners, such as in response to a user input requesting to enable or disable the application, in response to one or more events occurring (e.g., the balance in a digital wallet dropping to $0.00), and so forth.

Additionally or alternatively, the current context of the computing device 102 includes an operation context of the computing device 102 (e.g., the applications 110 of FIG. 1). The barcode selection module 204 can apply various rules or criteria based on the operation context of the computing device 102, such as selecting a barcode corresponding to an application 110 that activated the camera system 112 or launched a camera application rather than a barcode corresponding to other applications. For example, if a payment application ABC (e.g., a digital wallet) and a payment application XYZ (e.g., a different digital wallet) are both installed on the computing device 102, and the payment application ABC activates the camera system 112, the barcode selection module 204 selects a barcode that encodes a link to the payment application ABC rather than a barcode that encodes a link to the payment application XYZ.

Additionally or alternatively, the current context of the computing device 102 includes a security context of the computing device 102 (e.g., the applications 110 of FIG. 1). The barcode selection module 204 can apply various rules or criteria based on the security context of the computing device 102, such as selecting a barcode that codes not encode a link to a scam or an unsecure link. Scam or unsecure links can be identified in any of a variety of manners, such as accessing a remote store or server (e.g., in the cloud) that maintains a record of scam or unsecure links.

In one or more implementations, the barcode selection module 204 may select two or more of the multiple barcodes. For example, assume the barcode selection module 204 applies rules or criteria to select a barcode corresponding to an application 110 that is installed or enabled on the computing device 102 rather than a barcode corresponding to an application that is not installed or is disabled on the computing device 102. If a payment application ABC (e.g., a digital wallet) and a payment application XYZ (e.g., a different digital wallet) are both installed and enabled on the computing device 102, the barcode selection module 204 can select both the barcode that encodes a link to the payment application ABC and the barcode that encodes a link to the payment application XYZ.

The barcode selection module 204 outputs, to the application 110, a barcode selection 210 that indicates which of the multiple barcodes the barcode selection module 204 selected. The barcode selection 210 can take any of various forms, such as the barcode itself, an identifier of a location of the barcode in the image 206, and so forth. Although illustrated as application 110, additionally or alternatively the barcode selection 210 is output to the operating system 108. In one or more implementations, the barcode selection 210 is output to an application that caused the barcode selection system 114 to be activated, such as a camera application, a payment processing application, a digital wallet application, and so forth.

The application 110 receives images 206 and can identify barcodes in the images 206. The application 110 takes one or more of a variety of different actions based on the barcode selection 210 and the barcode in the preview images 206 generated by the camera system 112. In one or more implementations, the application 110 displays a link (e.g., a uniform resource locator (URL) encoded in the barcode). The user can then take various actions, such as clicking on the link to access the resource (e.g., a web page) identified by the link.

Additionally or alternatively, the application 110 automatically accesses the resource (e.g., a web page) identified by a link (e.g., a URL) encoded in the barcode. This accessing may include, for example, opening a web page identified by the link. It should be noted that the application 110 can display the barcode and then automatically access the resource, or automatically access the resource without displaying the barcode.

Additionally or alternatively, the application 110 opens another application on the computing device 102 associated with the barcode. For example, the barcode may be associated with a payment application or a digital wallet, and the application 110 automatically opens that payment application or digital wallet.

Additionally or alternatively, the application 110 processes a payment, or prompts the user to confirm a payment, associated with the barcode. For example, the barcode may be a payment link that is associated with transmitting a particular amount of money to a merchant, and the application 110 automatically transmits that amount of money from the user's digital wallet to the merchant or prompts the user to permit transmitting that amount of money from the user's digital wallet to the merchant.

Figure 3:
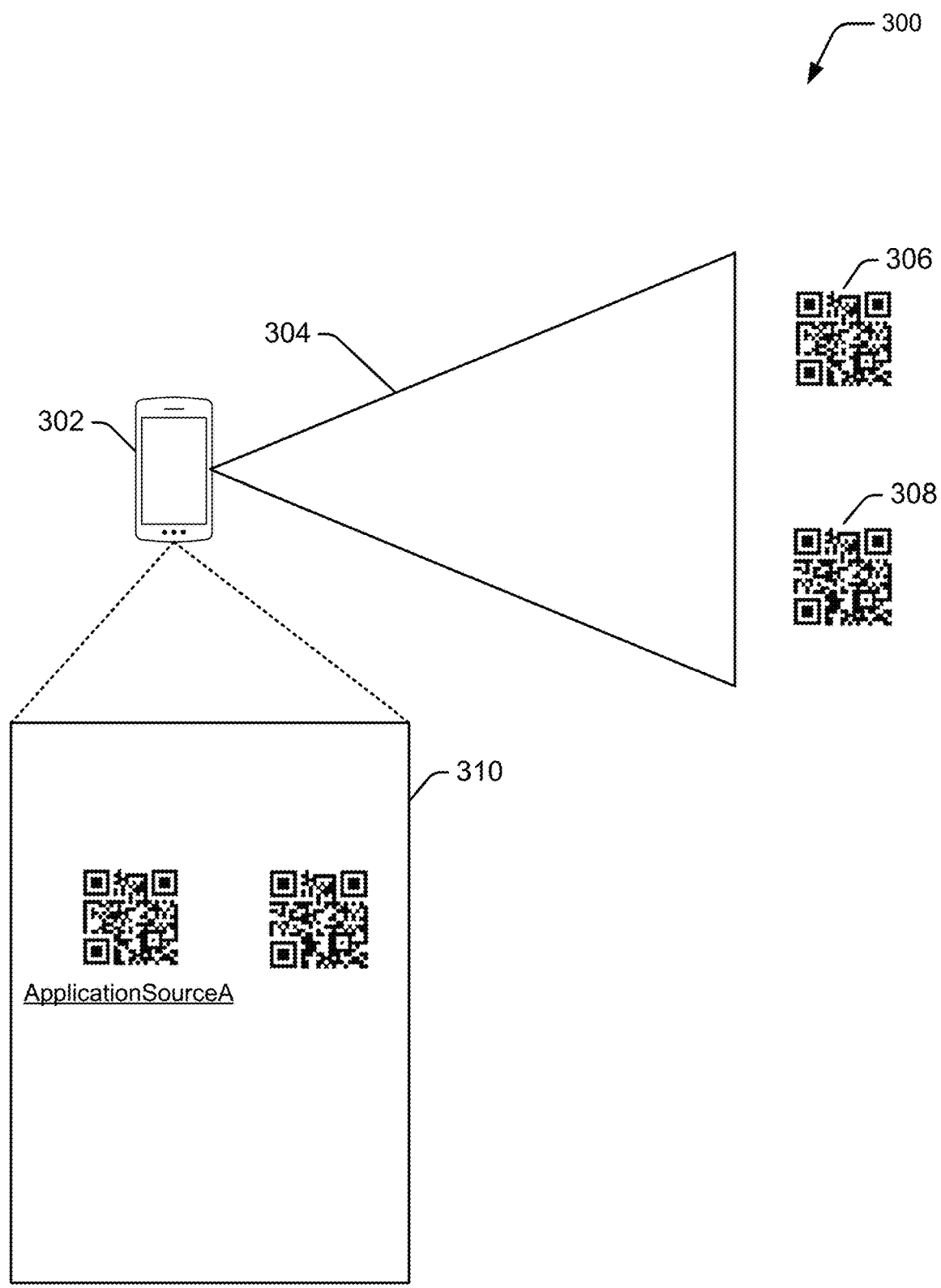
FIG. 3 illustrates an example of a computing device implementing the techniques discussed herein.

FIG. 3 illustrates an example 300 of a computing device 302 implementing the techniques discussed herein. The computing device 302 includes a camera system with a field of view 304 illustrated with solid lines. A QR code 306 and a QR code 308 are both within the field of view 304 of the camera system. Accordingly, the barcode identification module 202 identifies both QR codes 306 and 308, and the barcode selection module 204 selects one of the barcodes. In example 300, assume that an application source A (e.g., an online store) is a source of applications for the ANDROID® operating system and is encoded in the QR code 306. Further assume that an application source B (e.g., another online store) is a source of applications for the iOS® operating system and is encoded in the QR code 308. Assuming that the operating system of the computing device 302 is an ANDROID® operating system, the barcode selection module 204 selects the QR code 306. An application displays both QR codes 306 and 308 on display screen 310, but displays the link to application source A (encoded in the QR code 306) rather than the link to application source B (encoded in the QR code 308).

Figure 4:
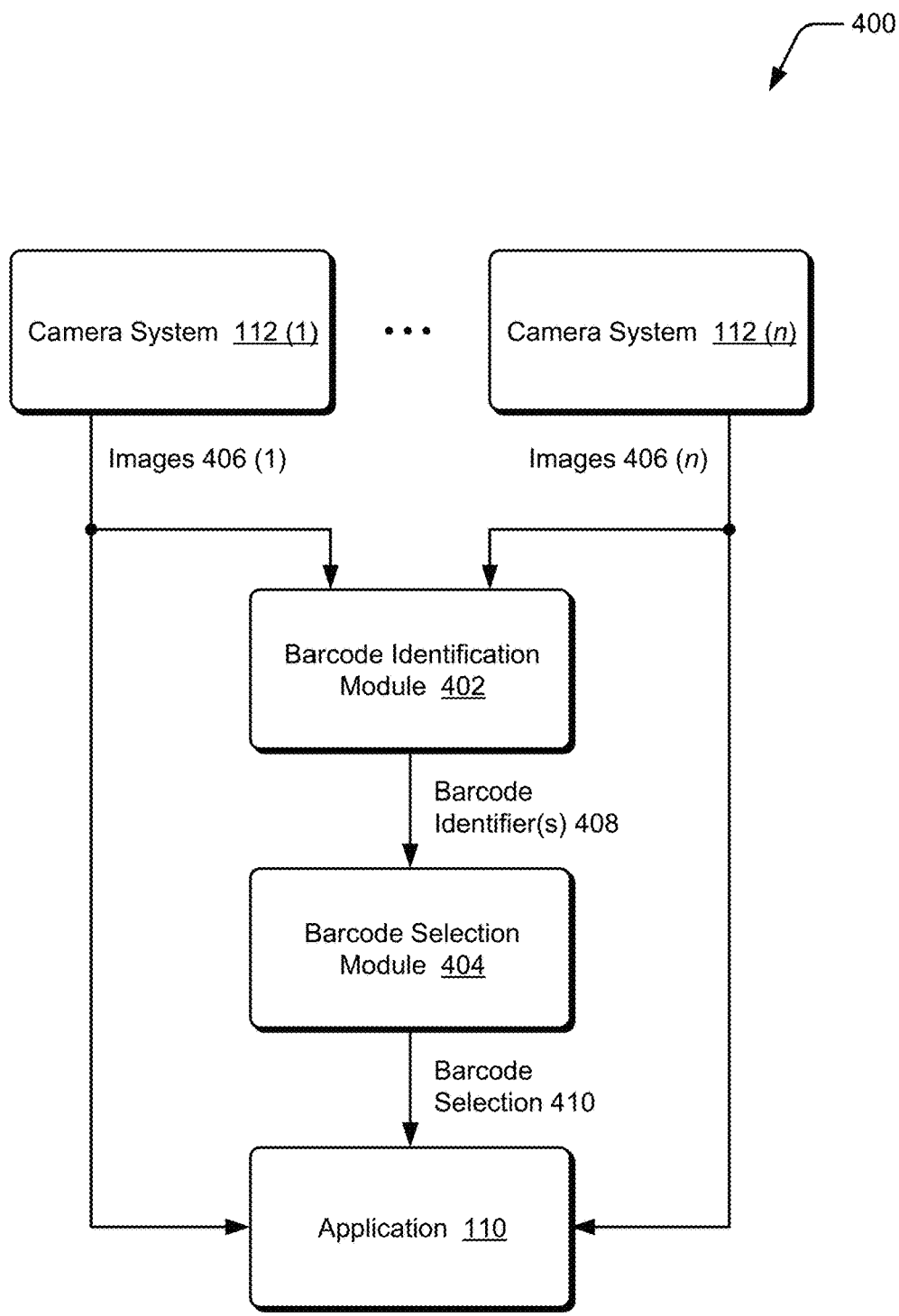
FIG. 4 illustrates another example system implementing the techniques discussed herein.

FIG. 4 illustrates an example system 400 implementing the techniques discussed herein. The system 400 is similar to the system 200 of FIG. 2, but differs in that the system 400 includes multiple camera systems 112 (1), . . . , 112 (n) rather than a single camera system 112 in the system 200. The system 400 includes a barcode identification module 402 (analogous to the barcode identification module 202 of FIG. 2), a barcode selection module 404 (analogous to the barcode selection module 204 of FIG. 2), and an application 110. In one or more implementations, the barcode identification module 402 and barcode selection module 404 are the barcode selection system 114 of FIG. 1.

Each of camera systems 112 (1), . . . , 112 (n) can be any of a variety of different types of image capture devices, such as a visible light camera (e.g., capturing images in the 400-700 nanometer (nm) range), an infrared camera (e.g., capturing images in the 1,000-14,000 nm range), and so forth. Additionally, each of camera systems 112 (1), . . . , 112 (n) has an associated focus range and field of view. Examples of camera systems 112 (1), . . . , 112 (n) include a tele or telephoto camera system having the smallest field of view, an ultra-wide camera system having the largest field of view, and a wide camera system having a field of view larger than the telephoto camera system but smaller than the ultra-wide camera system. Different ones of the camera systems 112 (1), . . . , 112 (n) can have different fields of view and the same focus range, different focus ranges and the same fields of view, or different focus ranges and different fields of view. For example, one of the camera systems 112 (1), . . . , 112 (n) can be a macro camera system having a closer focus range than any of the telephoto, wide, or ultra-wide camera systems 112 (1), . . . , 112 (n).

The camera systems 112 (1), . . . , 112 (n) provide images 406 (1), . . . , 406 (n) to the barcode identification module 402. These images 406 (1), . . . , 406 (n) are, for example, preview images as discussed above.

The barcode identification module 402 scans or analyzes the images 406 (1), . . . , 406 (n) to determine whether a barcode is within the field of view of an of the camera systems 112 (1), . . . , 112 (n) by determining whether any of the images 406 (1), 406 (n) includes a barcode. The barcode identification module 402 operates the same as the barcode identification module 202 of FIG. 2, except that the barcode identification module 402 determines whether a barcode is included in any one or more of the images 406 from any one or more of the camera systems 112 (1), . . . , 112 (n).

In one or more implementations, the images 406 (1), . . . , 406 (n) are scanned simultaneously or concurrently. This allows the barcode identification module 402 to quickly identify which of the camera systems 112 (1), . . . , 112 (n) have images that include barcodes. Additionally or alternatively, the images 406 (1), . . . , 406 (n) may be scanned at different timings, such as sequentially.

If the barcode identification module 402 determines that images 406 (1), . . . 406 (n) include multiple barcodes, the barcode selection module 404 receives multiple barcode identifiers 408 and selects one of the barcodes identified by the multiple barcode identifiers 408. In one or more implementations, the barcode selection module 404 selects one or more of the barcodes identified by the multiple barcode identifiers 408 based on a current context of the computing device 102, and applies any of various rules or criteria to select one of the multiple barcodes. The barcode selection module 404 operates the same as the barcode identification module 202 of FIG. 2, except that the barcode selection module 404 selects one of the barcodes in the images 406 (1), . . . , 406 (n) from any one or more of the camera systems 112 (1), . . . , 112 (n).

The barcode selection module 404 outputs, to the application 110, a barcode selection 410 that indicates which of the multiple barcodes the barcode selection module 404 selected. The barcode selection 410 can take any of various forms, such as the barcode itself, an identifier of a location of the barcode in the image 406, and so forth. Although illustrated as application 110, additionally or alternatively the barcode selection 410 is output to the operating system 108. In one or more implementations, the barcode selection 410 is output to an application that caused the barcode selection system 114 to be activated, such as a camera application, a payment processing application, a digital wallet application, and so forth.

The application 110 receives images 406 (1), . . . , 406 (n) and can identify barcodes in the images 406 (1), . . . , 406 (n). The application 110 takes one or more of a variety of different actions based on the barcode selection 410 and the barcode in the preview images 406 (1), . . . , 406 (n), analogous to the discussion above regarding the example system 200 of FIG. 2.

Figure 5:
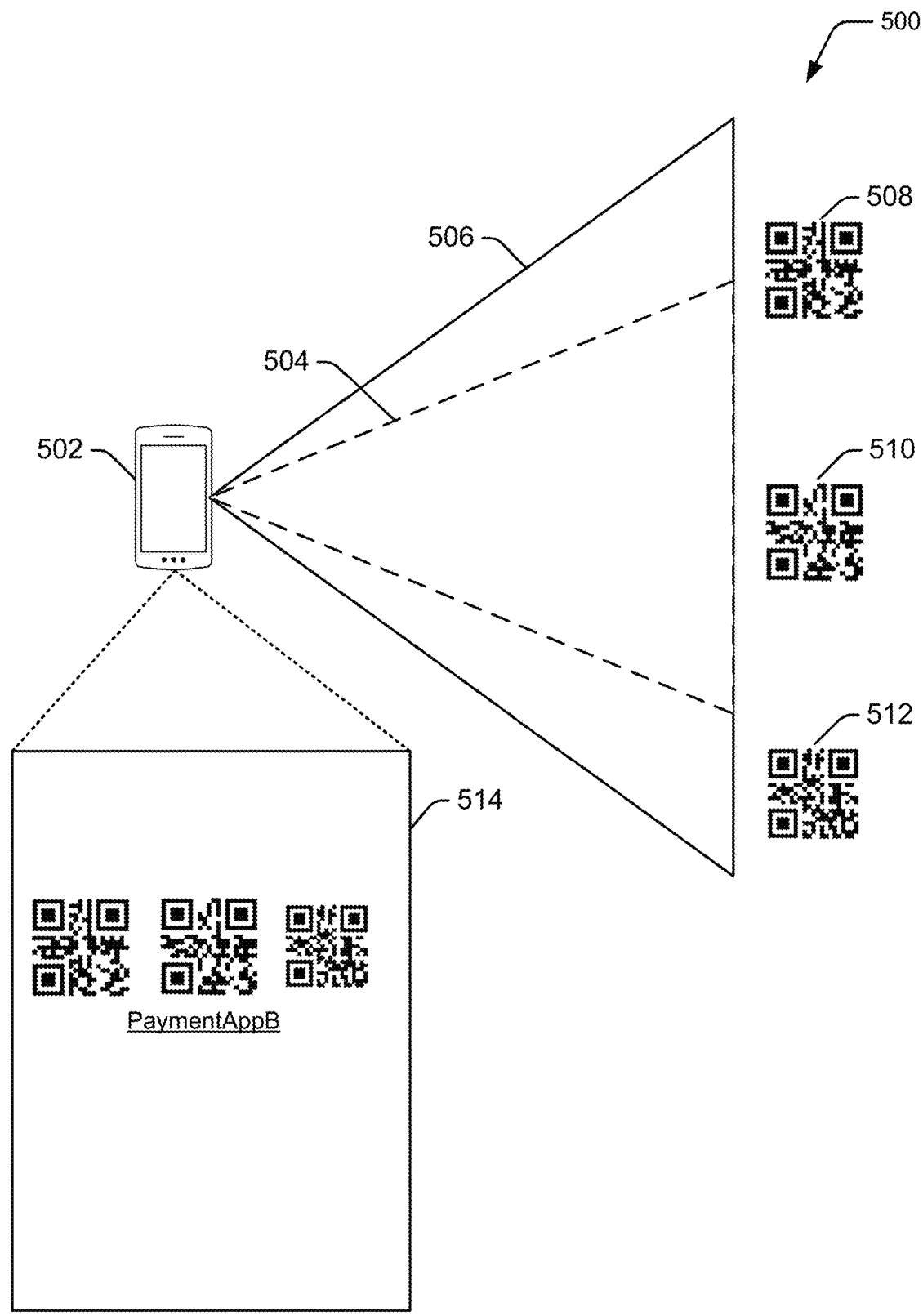
FIGS. 5, 6, and 7 illustrate examples of computing devices implementing the techniques discussed herein.

FIG. 5 illustrates an example 500 of a computing device 502 implementing the techniques discussed herein. The computing device 502 includes a telephoto camera system with a field of view 504 illustrated with dashed lines, and a wide angle camera system with a field of view 506 illustrated with solid lines. A QR code 508 is within the field of view 506, a QR code 510 is within the field of view 504 and 506, and a QR code 512 is within the field of view 506. Accordingly, the barcode identification module 402 identifies all three QR codes 508, 510, and 512, and the barcode selection module 404 selects one of the barcodes. In example 500, assume that an identifier of payment application A is encoded in the QR code 508, an identifier of a payment application B is encoded in the QR code 510, and an identifier of a payment application C is encoded in the QR code 512. Assuming that the barcode selection module 404 selects the QR code 510 (e.g., because payment application B is installed on the computing device 502 but payment application A and payment application C are not installed on the computing device 502), an application displays QR codes 508, 510, and 512 on display screen 514, but displays the link to payment application B (encoded in the QR code 510) rather than the links to payment application A (encoded in the QR code 508) and payment application C (encoded in the QR code 512).

Returning to FIG. 1, the barcode selection system 114 can be activated at any of a variety of different times. In one or more implementations, the barcode selection system 114 is automatically activated when a camera application is launched or opened and remains activated for a duration of time, such as a threshold number of seconds (e.g., 10 seconds), until the camera application is closed, remains activated for as long as the camera application remains open, and so forth. The barcode selection system 114 may be automatically activated in response to the camera application being opened in a particular mode, such as a service mode for barcode scanning purposes.

Additionally or alternatively, the barcode selection system 114 is automatically activated in response to another application that is associated with scanning barcodes is opened. Such an application may be, for example, a payment application or payment wallet.

Additionally or alternatively, the barcode selection system 114 is activated in response to a command or request from a user of the computing device 102. For example, the user may request (e.g., via activation of an icon or widget, audible input, and so forth) to scan for barcodes, and the barcode selection system 114 is activated in response to that request.

Returning to FIG. 2, in one or more implementations the barcode identification module 202 identifies barcodes that encode payment links. Additionally or alternatively, the barcode identification module 202 may identify all barcodes and the barcode selection module 204 may select the identified barcodes that include payment links. Payment links can be identified in any of a variety of manners, such as the wording in the encoded payment link, comparing the information encoded in a barcode to a record of known payment links, and so forth. The barcode identification module 202 provides the barcode identifiers 208 to the barcode selection module 204.

In one or more implementations, the barcode identification module 202 identifies only ones of the multiple barcodes that encode payment links that are secure (e.g., the barcode identification module 202 does not identify barcodes that are scam or unsecure links). Scam or unsecure links can be identified in any of a variety of manners, such as accessing a remote store or server (e.g., in the cloud) that maintains a record of scam or unsecure links.

The barcode selection module 204 displays, for each of the barcodes identified by the barcode identifiers 208, the barcode, the payment link encoded in the barcode, and a description of the payment link. The description of the payment link provides additional information regarding the payment link, allowing the user to make a more informed selection of one of the multiple barcodes (or payment links).

In one or more implementations, the barcode selection module 204 displays the barcode, the payment link encoded in the barcode, and the description of the barcode in a tile. A tile refers to an area of the display screen (e.g., an approximately rectangular area or area of other geometric shape) in which all of the information (the barcode, the payment link, the barcode description) is displayed. The tiles may be of uniform size, or different tiles may be of different sizes.

In one or more implementations, the barcode selection module 204 takes a screenshot of the image 206 that includes the barcode and displays this screenshot as the barcode, the payment link encoded in the barcode, and the description of the barcode. The screenshot extends beyond the barcode so as to capture additional information describing the barcode that is surrounding the barcode within the field of view of the camera system. The area extending beyond the barcode may be identified in any of a variety of manners. For example, the area extending beyond the barcode may be a set number of pixels in each of the x and y dimensions extending out from the barcode (e.g., 100 pixels to the left, to the right, above, and below the barcode). By way of another example, a machine learning system (e.g., a neural network) may be trained to identify the area extending beyond the barcode. By way of another example, the barcode may be displayed on a physical card or placard (e.g., on the counter in a store) and the area extending beyond the barcode may extend to the edges of the card or placard that displays the barcode. The edges of a card or placard can be identified using any of a variety of public or proprietary edge detection techniques.

In one or more implementations, the barcode selection module 204 displays additional information corresponding to the barcode to assist the user in deciding which payment link to select. Any of various information that may be helpful to the user may be displayed. For example, the information may be a current balance (e.g., amount of money or credit) in a digital wallet corresponding to the payment link, a reward (e.g., loyalty points) for using a digital wallet corresponding to the payment link, a discount or cash back for using a digital wallet corresponding to the payment link, advertisements to entice the user to use a digital wallet corresponding to the payment link, and so forth.

The barcode selection module 204 receives a user input selecting one of the displayed payment links. In response, the barcode selection module 204 initiates a payment transfer from a digital wallet (e.g., on the computing device 102) corresponding to the selected payment link by providing, to the application 110, a barcode selection 210 that identifies the user-selected payment link.

Figure 6:
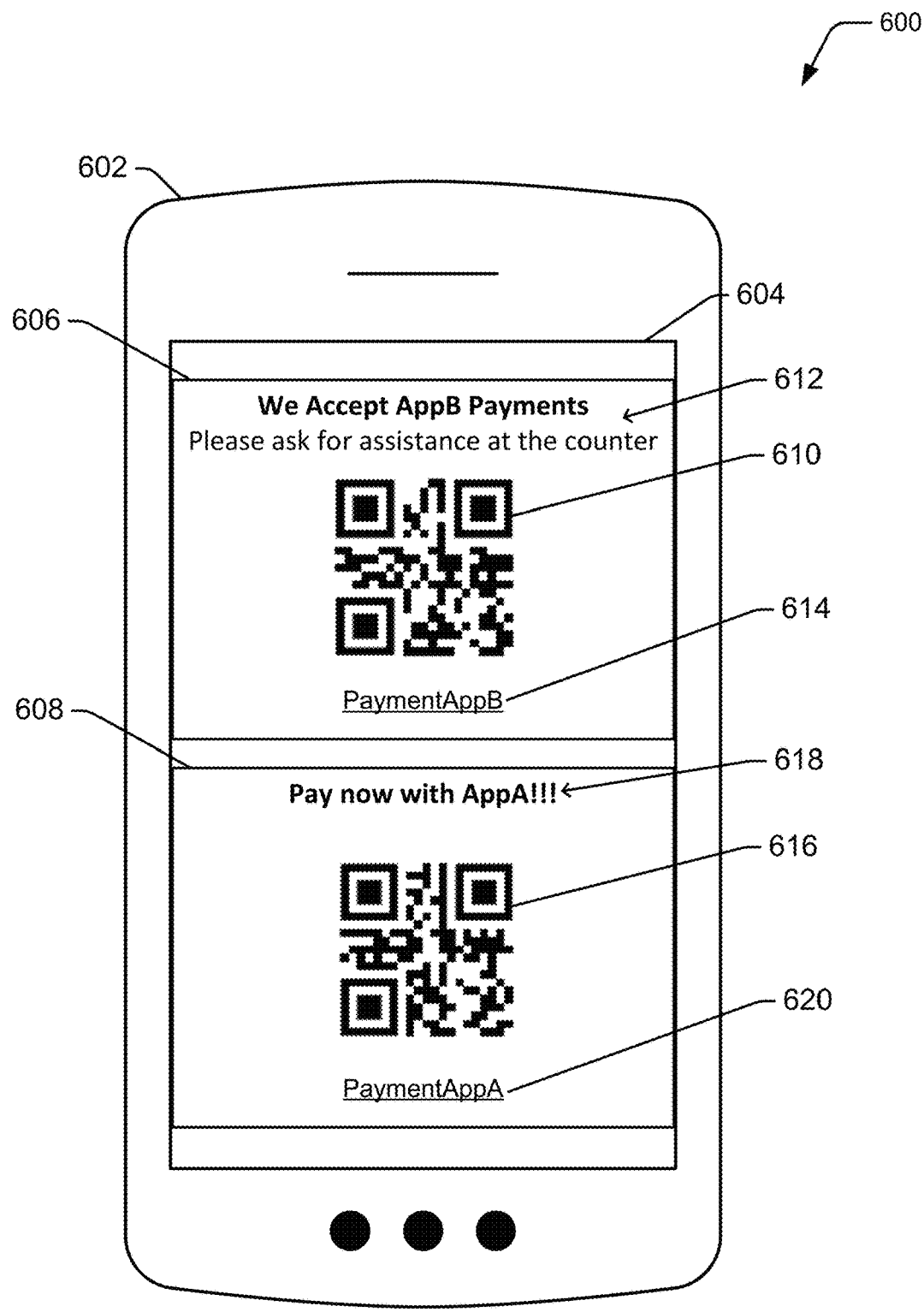

FIG. 6 illustrates an example 600 of a computing device 602 implementing the techniques discussed herein. The computing device 602 includes a display 604 that displays two tiles 606 and 608. The tile 606 includes a screenshot of a barcode and the area extending beyond the barcode, illustrated as the barcode 610 and a note 612 from the merchant. The payment link 614 encoded in the barcode 610 is also displayed in the tile 606. The tile 608 includes a screenshot of another barcode and the area extending beyond the barcode, illustrated as the barcode 616 and a note 618 from the merchant. The payment link 620 encoded in the barcode 616 is also displayed in the tile 608.

Figure 7:
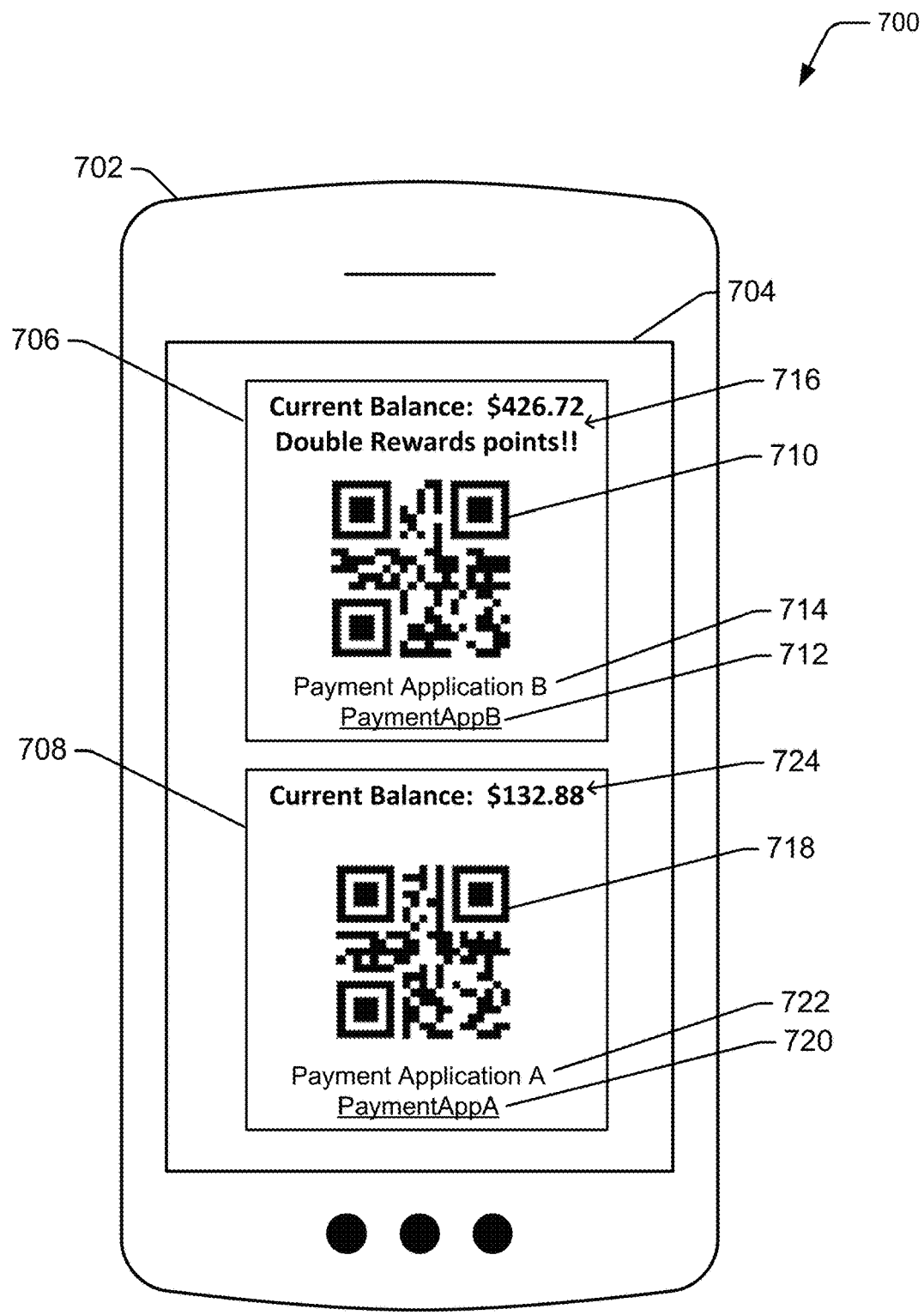

FIG. 7 illustrates an example 700 of a computing device 702 implementing the techniques discussed herein. The computing device 702 includes a display 704 that displays two tiles 706 and 708. The tile 706 includes a barcode 710 and additional information generated or obtained by the barcode selection module 204 (e.g., from a digital wallet on the computing device 102) rather than a screenshot from an image 206. The payment link 712 encoded in the barcode 710 and the name 714 of the payment application (or digital wallet) corresponding to the payment link 712 are also displayed in the tile 706. Additional information 716 that may be helpful to the user is also displayed, illustrated as a current balance in the digital wallet corresponding to the payment link 712 and a rewards points incentive the user would receive by using the digital wallet corresponding to the payment link 712. Such rewards points may be later used by the user to receive various benefits (e.g., discounts, free services or products, etc.).

The tile 708 includes a barcode 718 and additional information generated or obtained by the barcode selection module 204 (e.g., from a digital wallet on the computing device 102) rather than a screenshot from an image 206. The payment link 720 encoded in the barcode 718 and the name 722 of the payment application (or digital wallet) corresponding to the payment link 720 are also displayed in the tile 708. Additional information 724 that may be helpful to the user is also displayed, illustrated as a current balance in the digital wallet corresponding to the payment link 720.

Figure 8:
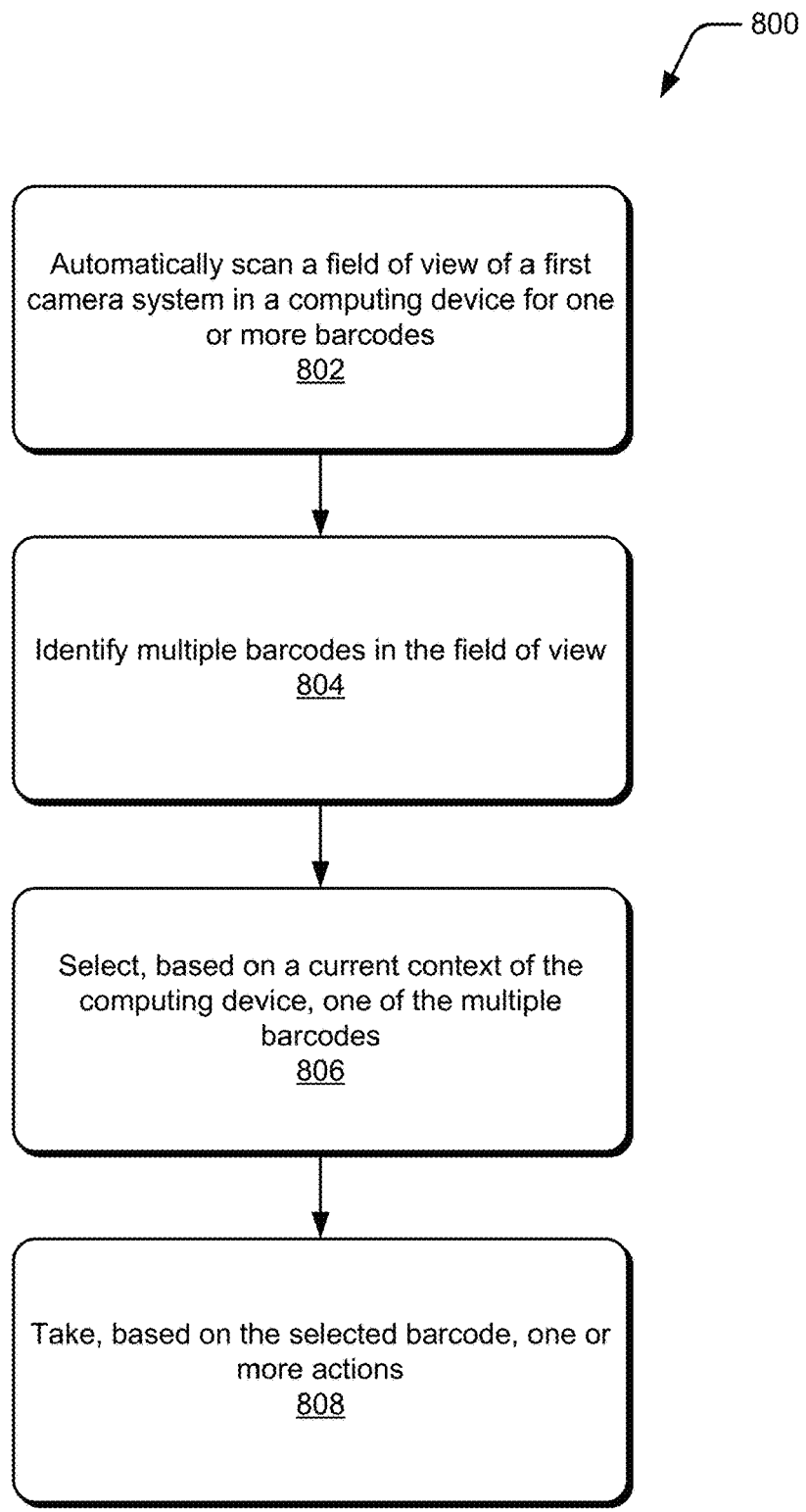
FIG. 8 illustrates an example process for implementing the techniques discussed herein in accordance with one or more embodiments.

FIG. 8 illustrates an example process 800 for implementing the techniques discussed herein in accordance with one or more embodiments. Process 800 is carried out by a camera selection system, such as barcode selection system 114 of FIG. 1, and can be implemented in software, firmware, hardware, or combinations thereof. Process 800 is shown as a set of acts and is not limited to the order shown for performing the operations of the various acts.

In process 800, the field of view of a camera system in a computing device is automatically scanned for one or more barcodes (act 802). Various camera systems can be used, such as telephoto, wide angle, ultra-wide angle, macro, and so forth camera systems.

Multiple barcodes in the field of view are identified (act 804).

One of the multiple barcodes is selected based on a current context of the computing device (act 806). The current context of the computing device may be one or more of an operating system running on the computing device, a configuration of the computing device, an operation context of the computing device, a security context of the computing device, and so forth.

One or more actions are taken based on the selected barcode (act 808). Any of various actions may be taken, such as displaying a link (e.g., a URL encoded in the barcode), automatically accessing the resource (e.g., a web page) identified by a link (e.g., a URL) encoded in the barcode, opening an application on the computing device associated with the barcode, processing a payment or prompting the user to confirm a payment associated with the barcode, and so forth.

Figure 9:
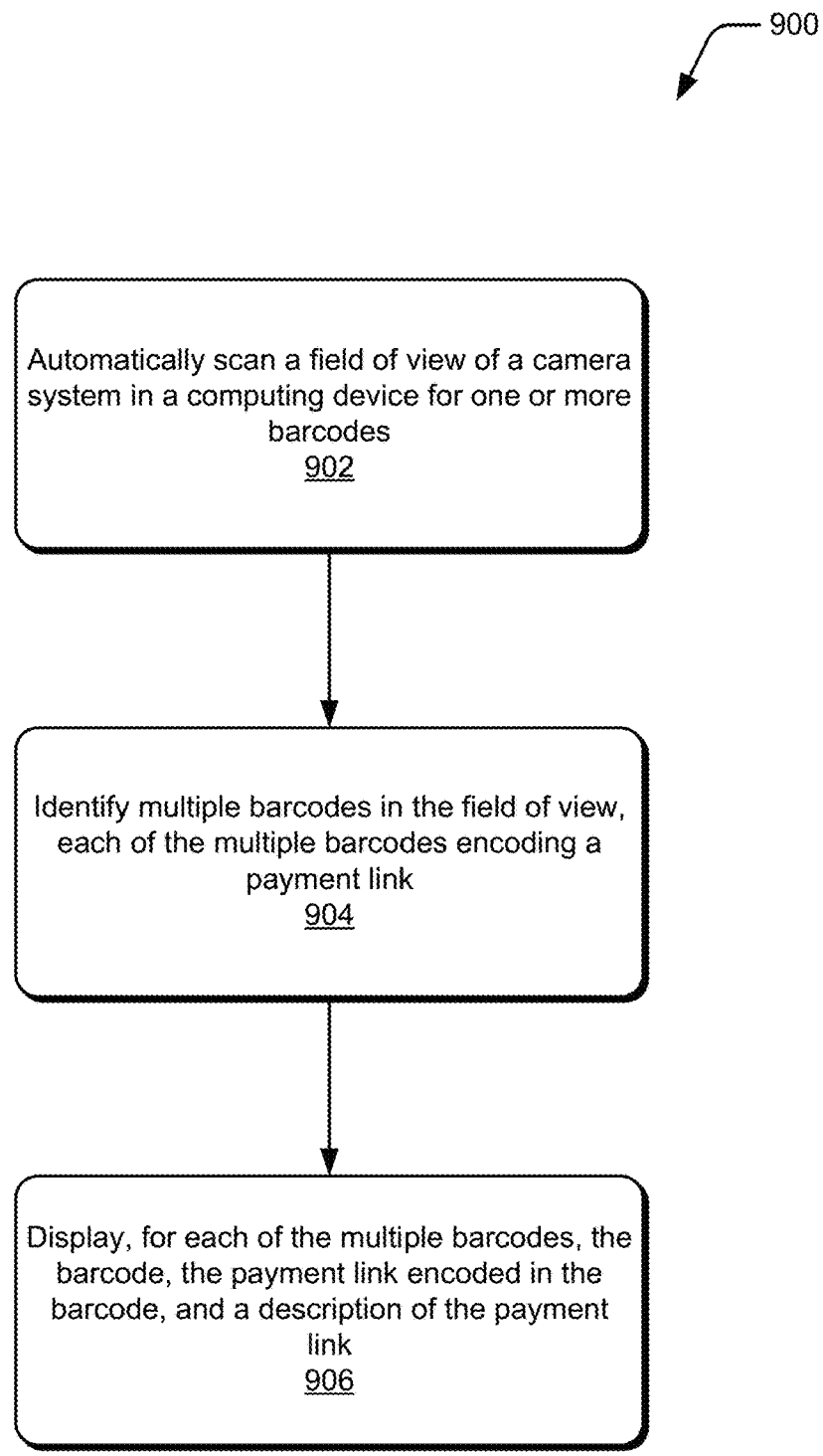
FIG. 9 illustrates an example process for implementing the techniques discussed herein in accordance with one or more embodiments.

FIG. 9 illustrates an example process 900 for implementing the techniques discussed herein in accordance with one or more embodiments. Process 900 is carried out by a camera selection system, such as barcode selection system 114 of FIG. 1, and can be implemented in software, firmware, hardware, or combinations thereof. Process 900 is shown as a set of acts and is not limited to the order shown for performing the operations of the various acts.

In process 900, the field of view of a camera system in a computing device is automatically scanned (act 902). Various camera systems can be used, such as telephoto, wide angle, ultra-wide angle, macro, and so forth camera systems.

Multiple barcodes in the field of view are identified (act 904). Each of the identified barcodes encodes a payment link.

For each of the multiple barcodes, the barcode, the payment link encoded in the barcode, and a description of the payment link are displayed (act 906). Additional information that may be helpful to the user is also displayed, such as a current balance (e.g., amount of money or credit) in a digital wallet corresponding to the payment link, a reward (e.g., loyalty points) for using a digital wallet corresponding to the payment link, a discount or cash back for using a digital wallet corresponding to the payment link, advertisements to entice the user to use a digital wallet corresponding to the payment link, and so forth.

Figure 10:
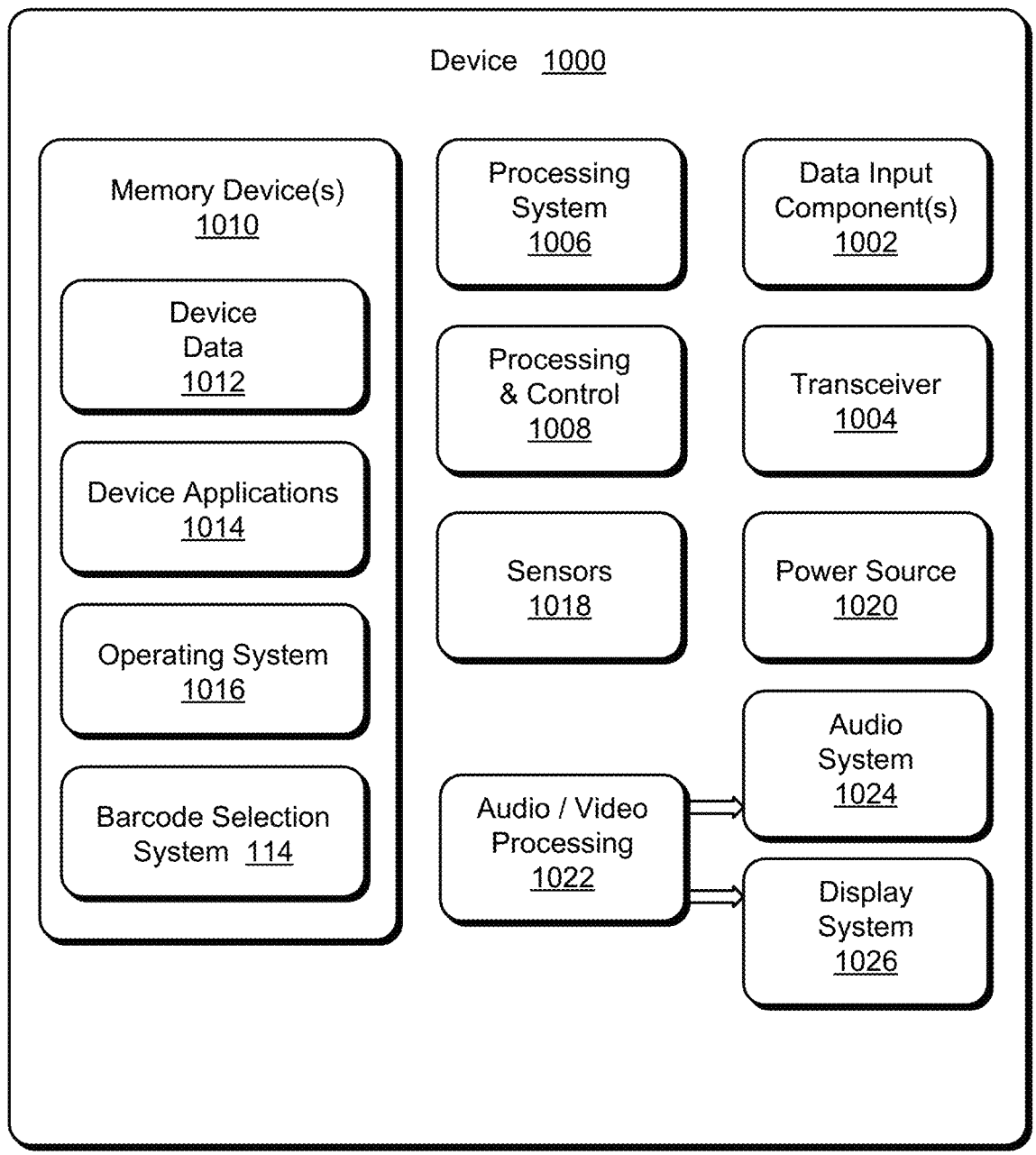
FIG. 10 illustrates various components of an example electronic device that can implement embodiments of the techniques discussed herein.

FIG. 10 illustrates various components of an example electronic device that can implement embodiments of the techniques discussed herein. The electronic device 1000 can be implemented as any of the devices described with reference to the previous FIGS., such as any type of client device, mobile phone, tablet, computing, communication, entertainment, gaming, media playback, or other type of electronic device. In one or more embodiments the electronic device 1000 includes the barcode selection system 114, described above.

The electronic device 1000 includes one or more data input components 1002 via which any type of data, media content, or inputs can be received such as user-selectable inputs, messages, music, television content, recorded video content, and any other type of text, audio, video, or image data received from any content or data source. The data input components 1002 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 1002 may also include various other input components such as microphones, touch sensors, touchscreens, keyboards, and so forth.

The device 1000 includes communication transceivers 1004 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 1000 includes a processing system 1006 of one or more processors (e.g., any of microprocessors, controllers, and the like) or a processor and memory system implemented as a system-on-chip (SoC) that processes computer-executable instructions. The processing system 1006 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 1008. The device 1000 may further include any type of a system bus or other data and command transfer system that couples the various components within the device. A system bus can include any one or combination of different bus structures and architectures, as well as control and data lines.

The device 1000 also includes computer-readable storage memory devices 1010 that enable one or both of data and instruction storage thereon, such as data storage devices that can be accessed by a computing device, and that provide persistent storage of data and executable instructions (e.g., software applications, programs, functions, and the like). Examples of the computer-readable storage memory devices 1010 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1000 may also include a mass storage media device.

The computer-readable storage memory device 1010 provides data storage mechanisms to store the device data 1012, other types of information or data, and various device applications 1014 (e.g., software applications). For example, an operating system 1016 can be maintained as software instructions with a memory device and executed by the processing system 1006 to cause the processing system 1006 to perform various acts. The device applications 1014 may also include a device manager, such as any form of a control application, software application, signal-processing and control module, code that is native to a particular device, a hardware abstraction layer for a particular device, and so on.

The device 1000 can also include one or more device sensors 1018, such as any one or more of an ambient light sensor, a proximity sensor, a touch sensor, an infrared (IR) sensor, accelerometer, gyroscope, thermal sensor, audio sensor (e.g., microphone), and the like. The device 1000 can also include one or more power sources 1020, such as when the device 1000 is implemented as a mobile device. The power sources 1020 may include a charging or power system, and can be implemented as a flexible strip battery, a rechargeable battery, a charged super-capacitor, or any other type of active or passive power source.

The device 1000 additionally includes an audio or video processing system 1022 that generates one or both of audio data for an audio system 1024 and display data for a display system 1026. In accordance with some embodiments, the audio/video processing system 1022 is configured to receive call audio data from the transceiver 1004 and communicate the call audio data to the audio system 1024 for playback at the device 1000. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for facilitating user selection of one of multiple barcodes in a camera system field of view have been described in language specific to features or methods, the subject of the appended claims is not necessarily limited to the specific features or methods described. Rather, the specific features and methods are disclosed as example implementations of techniques for implementing facilitating user selection of one of multiple barcodes in a camera system field of view. Further, various different embodiments are described, and it is to be appreciated that each described embodiment can be implemented independently or in connection with one or more other described embodiments. Additional aspects of the techniques, features, and/or methods discussed herein relate to one or more of the following:

In some aspects, the techniques described herein relate to a method including: automatically scanning a field of view of a camera system in a computing device for one or more barcodes; identifying multiple barcodes in the field of view, each of the multiple barcodes encoding a payment link; and displaying, for each of the multiple barcodes, the barcode, the payment link encoded in the barcode, and a description of the payment link.

In some aspects, the techniques described herein relate to a method, further including: receiving user selection of the payment link encoded in one of the multiple barcodes; and initiating, in response to the user selection, a payment transfer from a digital wallet corresponding to the payment link.

In some aspects, the techniques described herein relate to a method, the identifying including identifying one of the multiple barcodes encoding secure payment links.

In some aspects, the techniques described herein relate to a method, the displaying including displaying, for each of the multiple barcodes, a screenshot of an area surrounding the barcode in the field of view.

In some aspects, the techniques described herein relate to a method, the displaying including displaying, for each of the multiple barcodes, information related to a digital wallet corresponding to the payment link.

In some aspects, the techniques described herein relate to a method, wherein the information includes a current balance in the digital wallet.

In some aspects, the techniques described herein relate to a method, wherein the information includes a reward for using the digital wallet.

In some aspects, the techniques described herein relate to a method, wherein the information includes a discount for using the digital wallet.

In some aspects, the techniques described herein relate to a method, wherein the barcode includes a quick response (QR) code.

In some aspects, the techniques described herein relate to a computing device including: a processor implemented in hardware; a camera system: a computer-readable storage memory having stored thereon multiple instructions that, responsive to execution by the processor, cause the processor to perform acts including: automatically scanning a field of view of the camera system for one or more barcodes; identifying multiple barcodes in the field of view, each of the multiple barcodes encoding a payment link; and displaying, for each of the multiple barcodes, the barcode, the payment link encoded in the barcode, and a description of the payment link.

In some aspects, the techniques described herein relate to a computing device, the acts further including: receiving user selection of the payment link encoded in one of the multiple barcodes; and initiating, in response to the user selection, a payment transfer from a digital wallet corresponding to the payment link.

In some aspects, the techniques described herein relate to a computing device, the identifying including identifying one of the multiple barcodes encoding secure payment links.

In some aspects, the techniques described herein relate to a computing device, the displaying including displaying, for each of the multiple barcodes, a screenshot of an area surrounding the barcode in the field of view.

In some aspects, the techniques described herein relate to a computing device, the displaying including displaying, for each of the multiple barcodes, information related to a digital wallet corresponding to the payment link.

In some aspects, the techniques described herein relate to a computing device, wherein the barcode includes a quick response (QR) code.

In some aspects, the techniques described herein relate to a system including: a barcode identification module, implemented at least in part in hardware, to automatically scan a field of view of a camera system in a computing device for one or more barcodes and to identify multiple barcodes in the field of view, each of the multiple barcodes encoding a payment link; and a barcode selection module, implemented at least in part in hardware, to display, for each of the multiple barcodes, the barcode, the payment link encoded in the barcode, and a description of the payment link.

In some aspects, the techniques described herein relate to a system, wherein the barcode selection module is further to display, for each of the multiple barcodes, information related to a digital wallet corresponding to the payment link.

In some aspects, the techniques described herein relate to a system, wherein the information includes a current balance in the digital wallet.

In some aspects, the techniques described herein relate to a system, wherein the information includes a reward for using the digital wallet.

In some aspects, the techniques described herein relate to a system, wherein the information includes a discount for using the digital wallet.

What is claimed is:

1. A method comprising:
   automatically scanning a field of view of a camera system in a computing device for one or more barcodes;
   identifying multiple barcodes in the field of view, the multiple barcodes including only barcodes that encode a payment link, and excluding from the multiple barcodes a barcode in the field of view that encodes a scam or unsecure link;
   displaying, in a first portion of a display, a first barcode of the multiple barcodes and information associated with the first barcode, the information associated with the first barcode including a first payment link encoded in the first barcode, a description of the first payment link, a current balance in a first digital wallet corresponding to the first payment link, and a reward or discount for using a first digital wallet corresponding to the first payment link; and
   displaying, in a second portion of the display, a second barcode of the multiple barcodes and information associated with the second barcode, the information associated with the second barcode including a second payment link encoded in the second barcode, and a description of the second payment link, and a current balance in a second digital wallet corresponding to the second payment link, and a reward or discount for using the second digital wallet corresponding to the second payment link.

2. The method of claim 1, further comprising:
   receiving user selection of the first payment link; and
   initiating, in response to the user selection, a payment transfer from the first digital wallet.

3. The method of claim 1, the identifying comprising identifying one of the multiple barcodes encoding secure payment links.

4. The method of claim 1, wherein the first barcode comprises a first quick response (QR) code and the second barcode comprises a second QR code.

5. The method of claim 1, further comprising accessing a record at a remote store to determine, for each barcode in the field of view, whether the barcode is a scam or unsecure link.

6. The method of claim 1, the displaying the second barcode and the information associated with the second barcode further comprising displaying the second barcode and the information associated with the second barcode in the second portion of the display concurrently with displaying the first barcode and the information associated with the first barcode in the first portion of the display.

7. The method of claim 1, the first portion of the display comprising a first tile on the display and the second portion of the display comprising a second tile on the display.

8. The method of claim 1, the displaying the current balance in the first digital wallet comprising displaying the current balance in the first digital wallet adjacent to the first barcode, and the displaying the current balance in the second digital wallet comprising displaying the current balance in the second digital wallet adjacent to the second barcode.

9. A computing device comprising:
   a processor implemented in hardware;
   a camera system;
   a computer-readable storage memory having stored thereon multiple instructions that, responsive to execution by the processor, cause the processor to perform acts including:
   automatically scanning a field of view of the camera system for one or more barcodes;
   identifying multiple barcodes in the field of view, the multiple barcodes including only barcodes that encode a payment link, and excluding from the multiple barcodes a barcode in the field of view that encodes a scam or unsecure link;
   displaying, in a first portion of a display, a first barcode of the multiple barcodes and information associated with the first barcode, the information associated with the first barcode including a first payment link encoded in the first barcode, a description of the first payment link, a current balance in a first digital wallet corresponding to the first payment link, and a reward or discount for using a first digital wallet corresponding to the first payment link; and
   displaying, in a second portion of the display, a second barcode of the multiple barcodes and information associated with the second barcode, the information associated with the second barcode including a second payment link encoded in the second barcode, a description of the second payment link, a current balance in a second digital wallet corresponding to the second payment link, and a reward or discount for using the second digital wallet corresponding to the second payment link.

10. The computing device of claim 9, the acts further including:
    receiving user selection of the first payment link; and
    initiating, in response to the user selection, a payment transfer from the first digital wallet corresponding to the payment link.

11. The computing device of claim 9, wherein the first barcode comprises a first quick response (QR) code and the second barcode comprises a second QR code.

12. The computing device of claim 9, the first portion of the display comprising a first tile on the display and the second portion of the display comprising a second tile on the display, and the displaying the second barcode and the information associated with the second barcode further comprising displaying the second barcode and the information associated with the second barcode in the second tile of the display concurrently with displaying the first barcode and the information associated with the first barcode in the first tile of the display.

13. The computing device of claim 9, the displaying the current balance in the first digital wallet comprising displaying the current balance in the first digital wallet adjacent to the first barcode, and the displaying the current balance in the second digital wallet comprising displaying the current balance in the second digital wallet adjacent to the second barcode.

14. The computing device of claim 9, the acts further including accessing a record at a remote store to determine, for each barcode in the field of view, whether the barcode is a scam or unsecure link.

15. A system comprising:
a barcode identification module, implemented at least in part in hardware, to automatically scan a field of view of a camera system in a computing device for one or more barcodes and to identify multiple barcodes in the field of view, the multiple barcodes including only barcodes that encode a payment link, and excluding from the multiple barcodes a barcode in the field of view that encodes a scam or unsecure link; and
a barcode selection module, implemented at least in part in hardware, to display, in a first portion of a display, a first barcode of the multiple barcodes and information associated with the first barcode, the information associated with the first barcode including a first payment link encoded in the first barcode, a description of the first payment link, a current balance in a first digital wallet corresponding to the first payment link, and a reward or discount for using a first digital wallet corresponding to the first payment link, and display, in a second portion of the display, a second barcode of the multiple barcodes and information associated with the second barcode, the information associated with the second barcode including a second payment link encoded in the second barcode, a current balance in a second digital wallet corresponding to the second payment link, and a description of the second payment link, and a reward or discount for using the second digital wallet corresponding to the second payment link.

16. The system of claim 15, wherein the first barcode comprises a first quick response (QR) code and the second barcode comprises a second QR code.

17. The system of claim 15, the first portion of the display comprising a first tile on the display and the second portion of the display comprising a second tile on the display, and to display the second barcode and the information associated with the second barcode further comprises to display the second barcode and the information associated with the second barcode in the second tile of the display concurrently with display of the first barcode and the information associated with the first barcode in the first tile of the display.

18. The system of claim 15, wherein to identify the multiple barcodes, the barcode identification module is further to identify one of the multiple barcodes encoding a secure payment link.

19. The system of claim 15, wherein the barcode identification module is further to access a record at a remote store to determine, for each barcode in the field of view, whether the barcode is a scam or unsecure link.

20. The system of claim 15, wherein the barcode selection module is further to display the current balance in the first digital wallet adjacent to the first barcode, and display the current balance in the second digital wallet adjacent to the second barcode.

* * * * *